(12) United States Patent
Brant

(10) Patent No.: US 8,448,483 B2
(45) Date of Patent: May 28, 2013

(54) SECUREMENT APPARATUS FOR A VEHICLE STORAGE COMPARTMENT

(75) Inventor: Andrew Brant, Brighton, MI (US)

(73) Assignee: Nissan North America, Inc., Franklin, TN (US)

(*) Notice: Subject to any disclaimer, the term of this patent is extended or adjusted under 35 U.S.C. 154(b) by 155 days.

(21) Appl. No.: 12/857,846

(22) Filed: Aug. 17, 2010

(65) Prior Publication Data

US 2012/0043778 A1   Feb. 23, 2012

(51) Int. Cl.
*B65D 55/14* (2006.01)
*E05B 13/10* (2006.01)

(52) U.S. Cl.
USPC ........... 70/162; 70/208; 70/210; 70/DIG. 34; 292/106; 292/207; 292/DIG. 11; 292/DIG. 31; 296/24.34

(58) Field of Classification Search
USPC .................. 70/208, 210, 159–162, 215, 218, 70/221, 224, 467, 483–485, 489, 150, DIG. 8, 70/DIG. 31, DIG. 34, DIG. 67, DIG. 73; 292/DIG. 31, 207, 203, 194, 200, 101, 102, 292/106, 126, 128, DIG. 11, DIG. 63; 296/24.34, 37.8, 37.12, 100.04, 100.07
See application file for complete search history.

(56) References Cited

U.S. PATENT DOCUMENTS

| | | | | |
|---|---|---|---|---|
| 1,558,980 A * | 10/1925 | Halinka | ........................ | 292/166 |
| 2,784,993 A * | 3/1957 | Collar | ........................... | 292/223 |
| 3,044,815 A * | 7/1962 | Soss | ............................... | 292/173 |
| 3,270,536 A * | 9/1966 | Sprung | ............................. | 70/89 |
| 3,745,796 A * | 7/1973 | Fleming | ............................ | 70/81 |
| 4,335,595 A * | 6/1982 | Swan et al. | ..................... | 70/149 |
| 4,438,964 A * | 3/1984 | Peters | ........................... | 292/216 |
| 4,565,080 A * | 1/1986 | Kincaid et al. | .................. | 70/215 |
| 4,683,736 A * | 8/1987 | Weinerman et al. | ........... | 70/208 |
| 4,706,478 A * | 11/1987 | Swan et al. | ....................... | 70/28 |
| 4,768,360 A * | 9/1988 | Foshee | ........................... | 70/100 |
| 4,986,589 A | 1/1991 | McNew | | |
| 4,989,907 A * | 2/1991 | Edmonds et al. | ............. | 292/223 |
| 5,137,322 A | 8/1992 | Muirhead | | |
| 5,263,346 A * | 11/1993 | Sato et al. | ........................ | 70/210 |
| 5,347,834 A * | 9/1994 | Ramsauer | ........................ | 70/120 |
| 5,484,178 A * | 1/1996 | Sandhu et al. | ................. | 292/173 |
| 5,630,630 A * | 5/1997 | Price et al. | ..................... | 292/128 |
| 6,006,560 A * | 12/1999 | DeVries | .......................... | 70/208 |
| 6,082,786 A * | 7/2000 | Stephens et al. | .............. | 292/102 |
| 6,606,889 B1 * | 8/2003 | Tweedy | .......................... | 70/208 |
| 6,802,550 B1 | 10/2004 | Griggs, Jr. et al. | | |
| 7,171,833 B1 * | 2/2007 | Wu | ................................. | 70/491 |

(Continued)

FOREIGN PATENT DOCUMENTS

WO    WO-01/12925 A1    2/2001

*Primary Examiner* — Lloyd Gall
(74) *Attorney, Agent, or Firm* — Global IP Counselors, LLP

(57) ABSTRACT

A securement apparatus for a vehicle storage compartment includes a closure panel and a body portion. The securement apparatus includes a base portion, a handle, a tumbler and a lock. The base portion is configured to couple to the closure panel. The handle is pivotally coupled to the base portion to move between latched and unlatched positions, and includes a latch that is configured to engage the body portion while the handle is in the latched position. The tumbler is moveably disposed with respect to the base portion between locked and unlocked positions, and is configured to restrict movement of the handle from the latched position to the unlatched position while the tumbler is in the locked position. The lock is configured to move the tumbler between the locked and unlocked positions.

20 Claims, 20 Drawing Sheets

U.S. PATENT DOCUMENTS

| | | | |
|---|---|---|---|
| 7,383,707 B2 * | 6/2008 | Yamada et al. | 70/208 |
| 7,454,933 B1 * | 11/2008 | Paige et al. | 70/208 |
| 7,603,881 B2 * | 10/2009 | Yukihara et al. | 70/208 |
| RE41,188 E * | 4/2010 | Lurie et al. | 70/100 |
| 7,832,240 B2 * | 11/2010 | Najima | 70/208 |
| 8,136,850 B2 * | 3/2012 | Wollacott et al. | 292/173 |
| 2002/0124608 A1 * | 9/2002 | Segawa | 70/208 |
| 2005/0284199 A1 | 12/2005 | Gulley et al. | |
| 2006/0185406 A1 * | 8/2006 | Willems | 70/208 |
| 2007/0186598 A1 * | 8/2007 | Najima | 70/208 |
| 2008/0197648 A1 | 8/2008 | Smith | |
| 2011/0215606 A1 * | 9/2011 | Trivedi | 296/24.34 |

\* cited by examiner

SECUREMENT APPARATUS FOR A VEHICLE STORAGE COMPARTMENT

BACKGROUND

1. Field of the Invention

The present invention generally relates to a securement apparatus. More specifically, the present invention relates to a securement apparatus for a vehicle storage compartment.

2. Background Information

Vehicles typically include one or more storage compartments having closure panels, such as a lid, that prevent stored items from being dislodged while such vehicles are in motion. Such closure panels also obscure stored items from view within or outside of the vehicle. Therefore, storage compartments having closures panels are ideal for storing valuable or confidential items. For example, a glove compartment or a center console may be used to store items in this manner.

Vehicle storage compartments sometimes include locking mechanisms that prevent access to stored contents without an associated key. The key may or may not be the same key that is used to start the vehicle. Locks are sometimes located directly on a latch mechanism of a storage compartment. However, this arrangement becomes less feasible when a rotating handle is used to open the latch, since the handle is a moving part from which leverage is used to open the compartment. Locating the lock off of such a latch is possible, however, doing so increases the number of parts used and thus increases cost.

Also, it can be disadvantageous to allow the rotating handle of a locked latch to remain capable of rotating once in a locked state. This makes it impossible to consistently discern the actual state of the lock. For example, if an occupant is able to use the handle but the latch does not open, the occupant may simply think that the latch is stuck or damaged and attempt to force the compartment open, risking injury as well as damage to the storage compartment.

Accordingly, there is a continuing need for an improved securement apparatus for a vehicle storage compartment.

SUMMARY

It has been discovered that with conventional technology, a locking mechanism can be used with a closure panel or lid of a vehicle storage compartment to secure the contents of the vehicle storage compartment.

In view of the state of the known technology, one aspect of the present invention is to provide a securement apparatus for a vehicle storage compartment that includes a closure panel and a body portion. The securement apparatus includes a base portion, a handle, a tumbler and a lock. The base portion is configured to couple to the closure panel. The handle is pivotally coupled to the base portion to move between latched and unlatched positions, and includes a latch that is configured to engage the body portion while the handle is in the latched position. The tumbler is moveably disposed with respect to the base portion between locked and unlocked positions, and is configured to restrict movement of the handle from the latched position to the unlatched position while the tumbler is in the locked position. The lock is configured to move the tumbler between the locked and unlocked positions.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
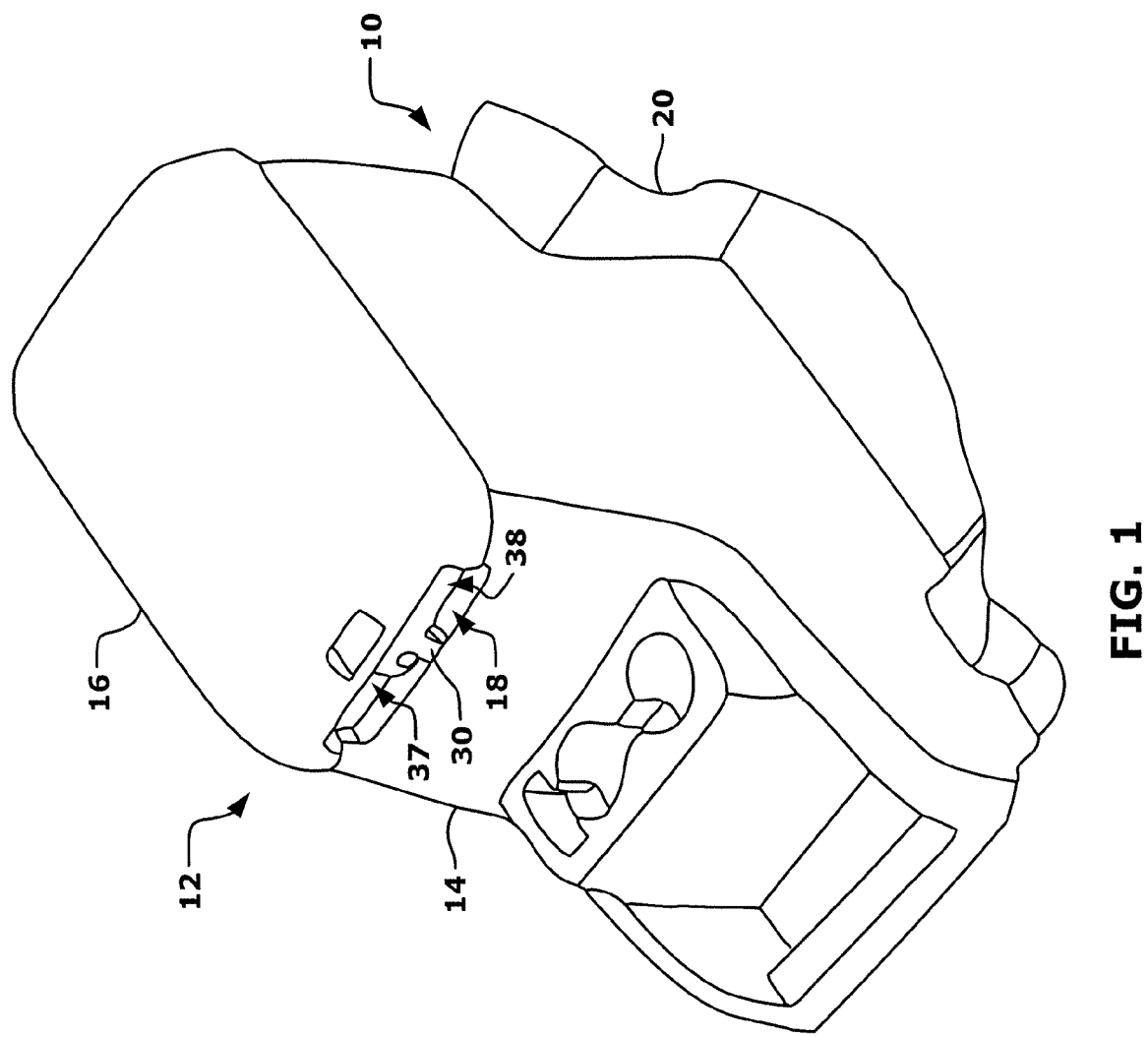
FIG. 1 is a perspective view of a vehicle console including a securement apparatus in accordance with an illustrated embodiment.
Figure 2:
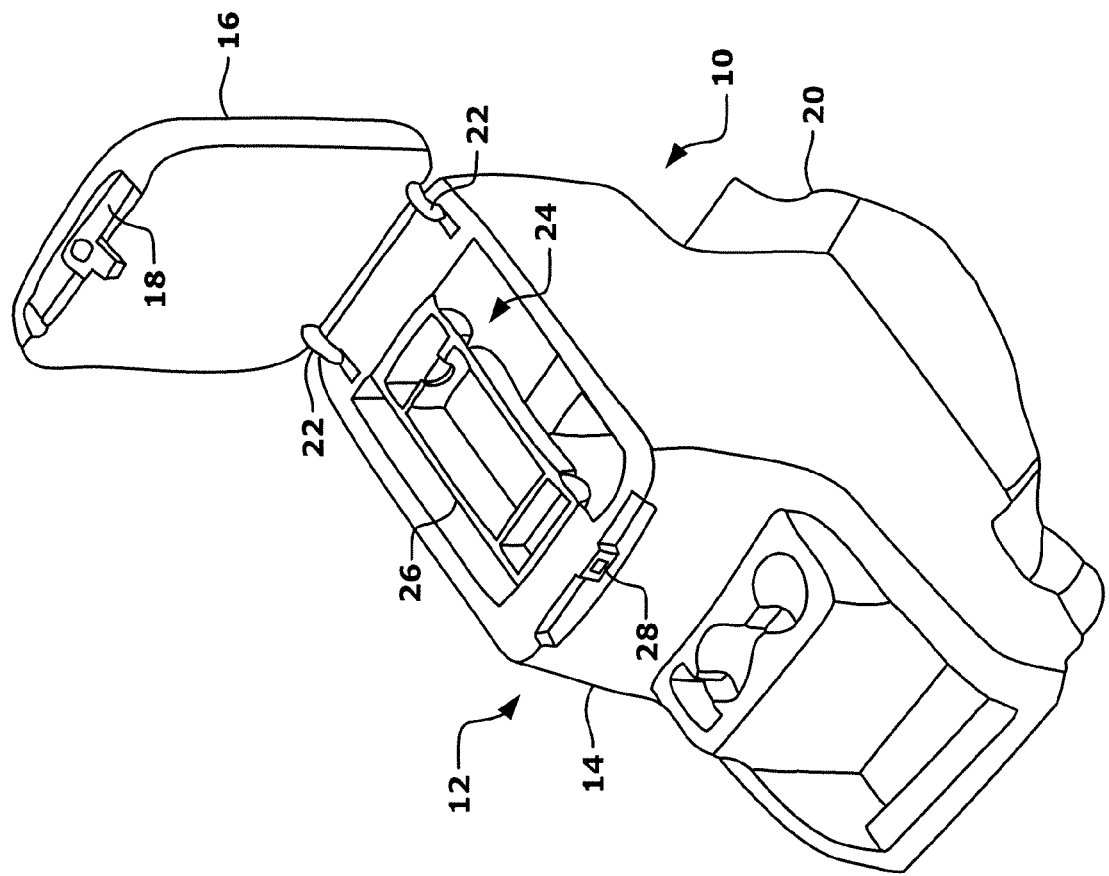
FIG. 2 is a perspective view of the vehicle console with a closure panel in an open position.

Referring initially to FIGS. 1 and 2, a portion of a vehicle 10 is illustrated that has a vehicle storage compartment 12 installed therein in accordance with one illustrated embodiment. In this illustrated embodiment, the vehicle storage compartment 12 is a center vehicle console that is located inside the vehicle 10 between a pair of front seats of the vehicle 10. However, the vehicle storage compartment 12 can be located in other areas of the vehicle 10 and can have other configurations (e.g., a glove compartment disposed in the front dash, a storage compartment located in the trunk, etc.).

In this illustrated embodiment, the vehicle storage compartment 12 includes, among other things, a body portion 14, a closure panel (e.g., a door or lid) 16 and a securement apparatus 18. The bottom of the body portion 14 can be fixed to a vehicle body panel 20 or other structure or component as needed and/or desired. The closure panel 16 is pivotally attached to the body portion 14 by, for example, hinges 22 (FIG. 2) for movement between a closed position (FIG. 1) and an open position (FIG. 2). Alternatively, the closure panel 16 can be configured as a sliding panel, or any other suitable type of cover for a storage compartment. Also, the securement apparatus 18 can be used with any type of closure panel 16 and body portion 14 that may or may not be used in a vehicle.

As further shown in FIG. 2, the body portion 14 defines an open ended compartment for cavity) with an access opening 24 for storing various articles. The body portion 14 can also support a tray 26 as in a conventional vehicle console. The body portion 14 in this example is formed of one or more hard rigid materials such as a hard rigid plastic material or any other suitable material(s). The body portion 14 also includes a catch or lip 28 as shown, for example, in FIGS. 4 and 5. The securement apparatus 18 includes a latch 30 (or latching projection) that engages the catch 28 to secure the closure panel 16 to the body portion 14 when the closure panel 16 is in the closed position as shown, for example, in FIGS. 1, 3 and 4. In this example, the catch 28 is located at the opposite end of the access opening 24 from the hinges 22 as shown in FIG. 2. As shown, for example, in FIG. 5, the latch 30 is released from the catch 28 as discussed in more detail below to allow the closure panel 16 to move from the closed position to the open position.

Figure 6:
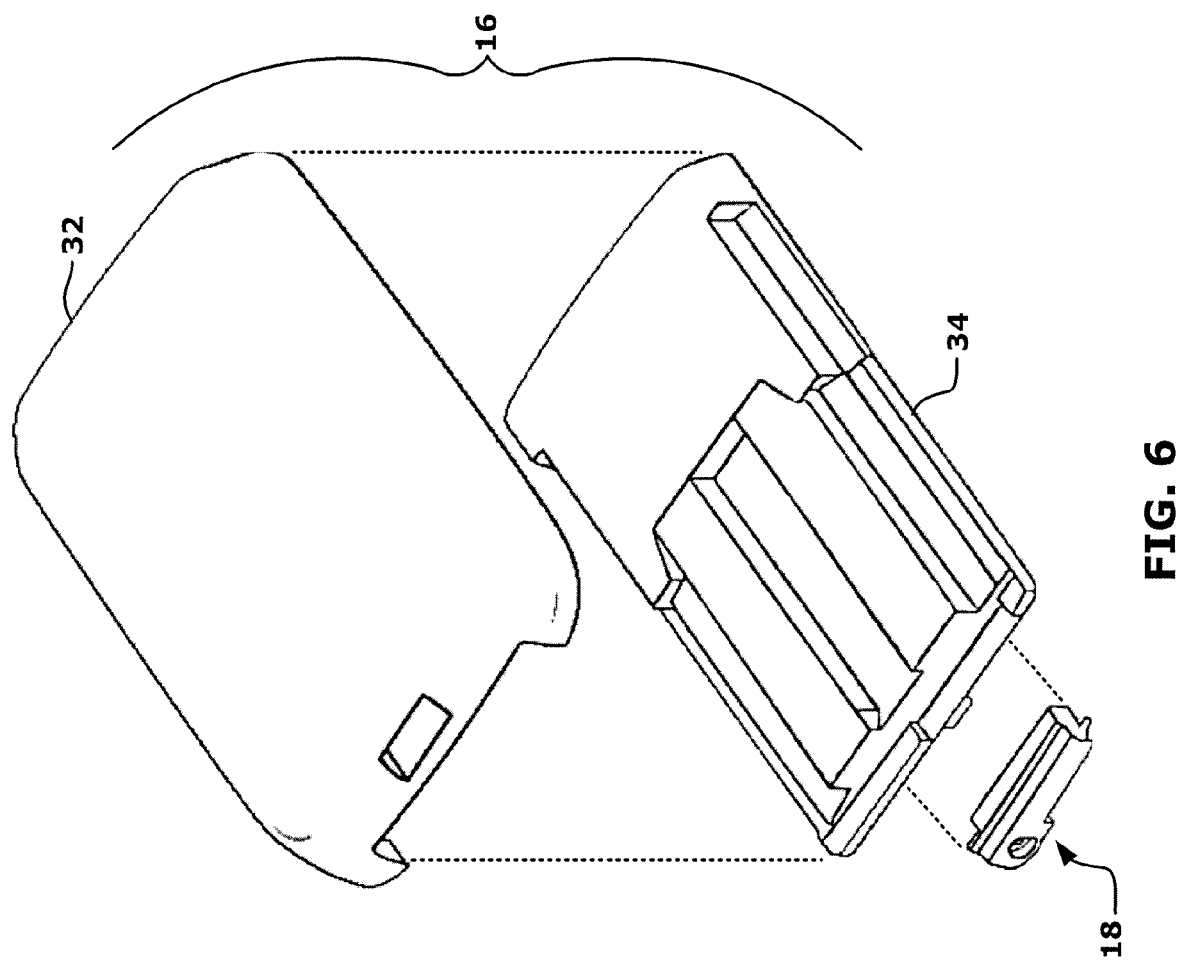
FIG. 6 is an exploded perspective view of the closure panel.

As best seen in FIG. 6, the closure panel 16 basically includes an upper lid assembly 32 and a lower lid assembly 34. The upper and lower lid assemblies 32 and 34 are secured together in a conventional manner, such as by snap fitting, screws or any other suitable fasteners. The upper lid 32 can be formed of one or more parts, as needed or desired. For example, the upper lid 32 is often formed with a frame that is covered with a cushioned material, with the frame being formed of one or more hard rigid materials such as a hard rigid plastic material or any other suitable material or materials. Likewise, the lower lid 34 can be formed of one or more parts, as needed or desired. For example, the lower lid 34 is often formed of one or more hard rigid materials such as a hard rigid plastic material or any other suitable material or materials. In the illustrated embodiment, the securement apparatus 18 is attached to the forward edge of the closure panel 16 between the upper and lower lids 32 and 34.

Figure 7:
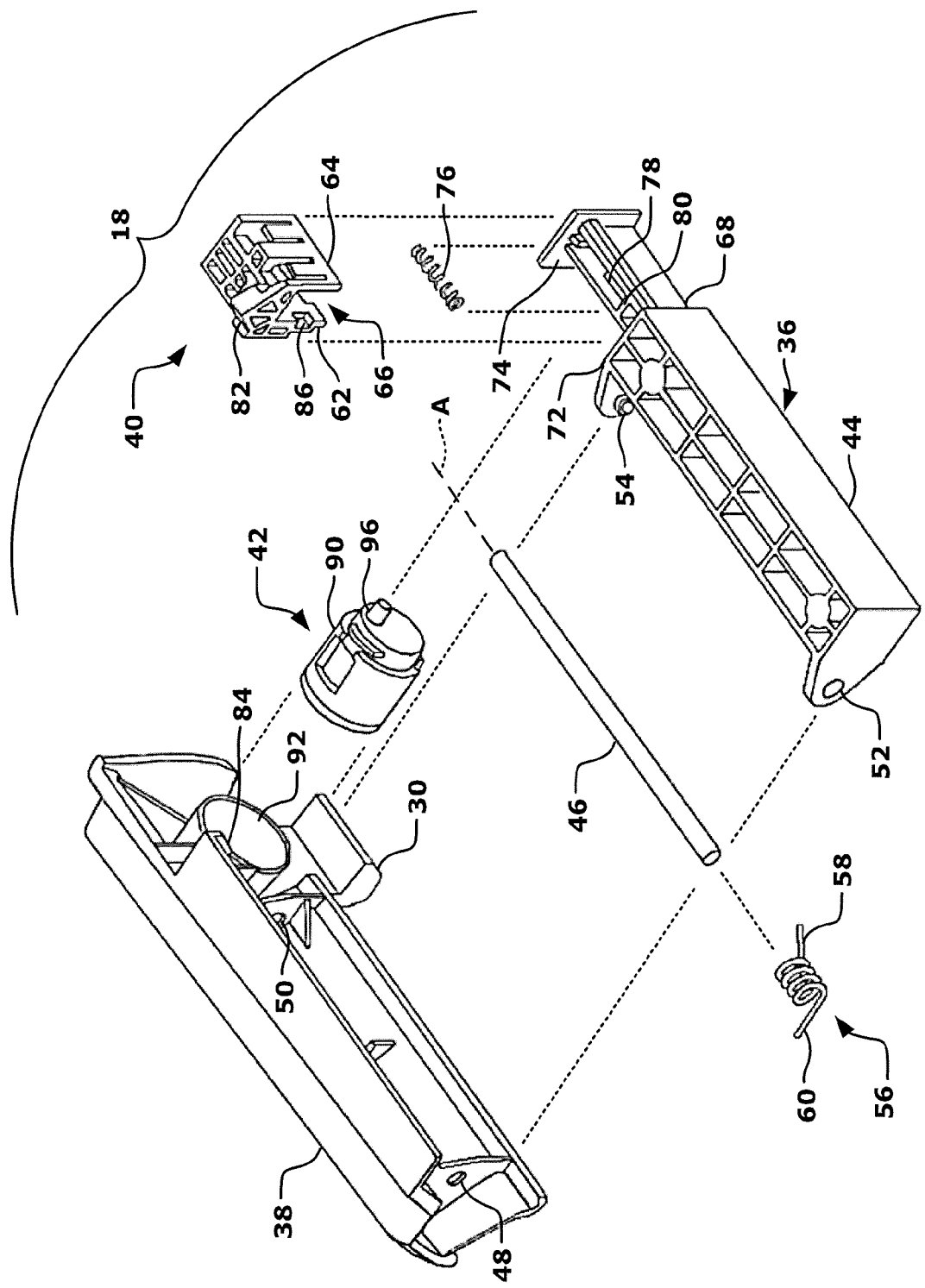
FIG. 7 is an exploded perspective view of the securement apparatus.

Further details of the securement apparatus 18 will now be discussed. As shown in FIG. 7, the securement apparatus 18 includes, among other things, a base portion 36, a handle 38, a tumbler 40 and a lock 42. As mentioned above, the securement apparatus 18 is configured to releasably lock the closure panel 16 to the body portion 14.

Figure 3:
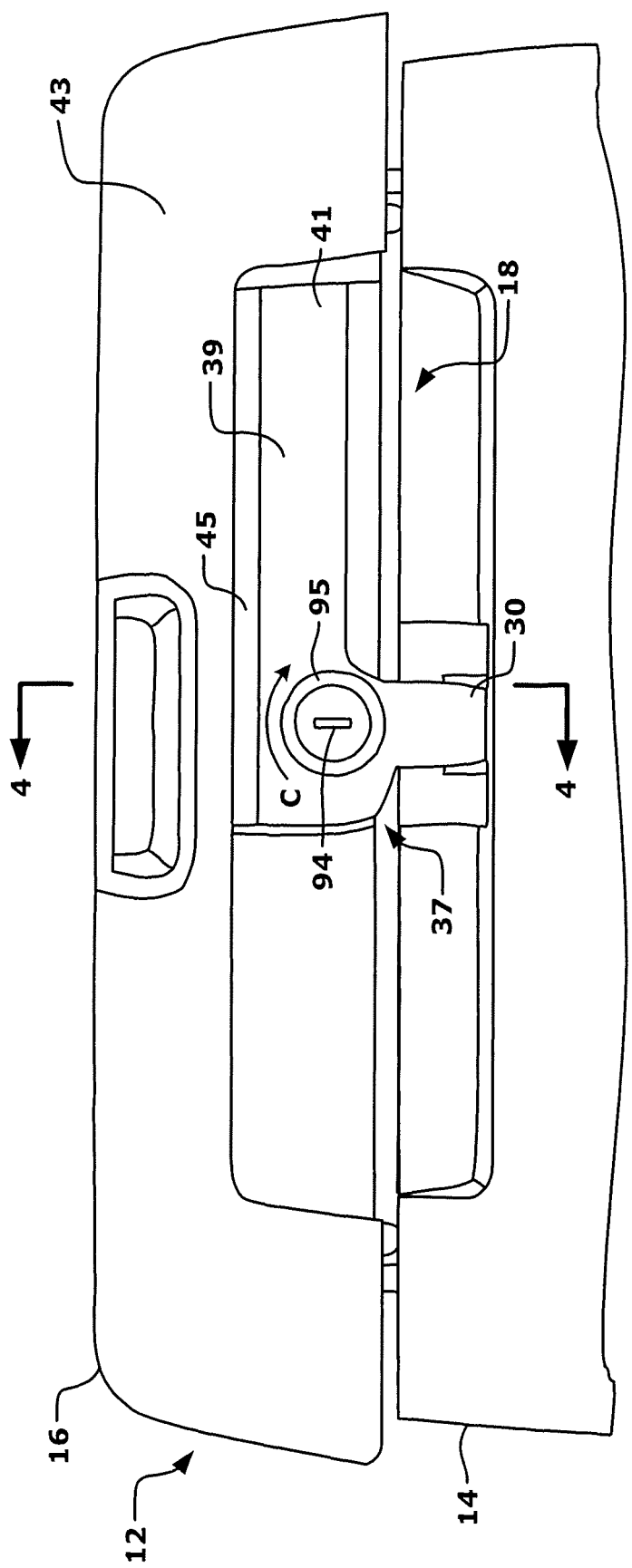
FIG. 3 is a front profile view of the vehicle console shown in FIG. 1 with the securement apparatus releasably coupling the closure panel to a body portion of the vehicle console.

In this arrangement, the base portion 36 is configured to couple to the closure panel 16. The base portion 36 can be coupled to the closure panel 16 by sandwiching the base portion 36 between the upper and lower lids 32 and 34 as shown. Also, fasteners such as screws, rivets, bolts, adhesive or the like can be used to secure the base portion 36 to the closure panel 16. Specifically, the handle 38 is configured for disposal in a recess 37 defined in the closure panel 16. The handle 38 includes an outer surface 39 having a first contoured surface portion 41 and the closure panel 16 includes an outer surface 43 having a second contoured surface portion 45, such that the first contoured surface portion 41 is configured to cooperate with the second contoured surface portion 45 to form an outer surface shape of the closure panel 16 while the handle 38 is received in the recess 39 and in the latched position (FIGS. 1 and 3).

Figure 4:
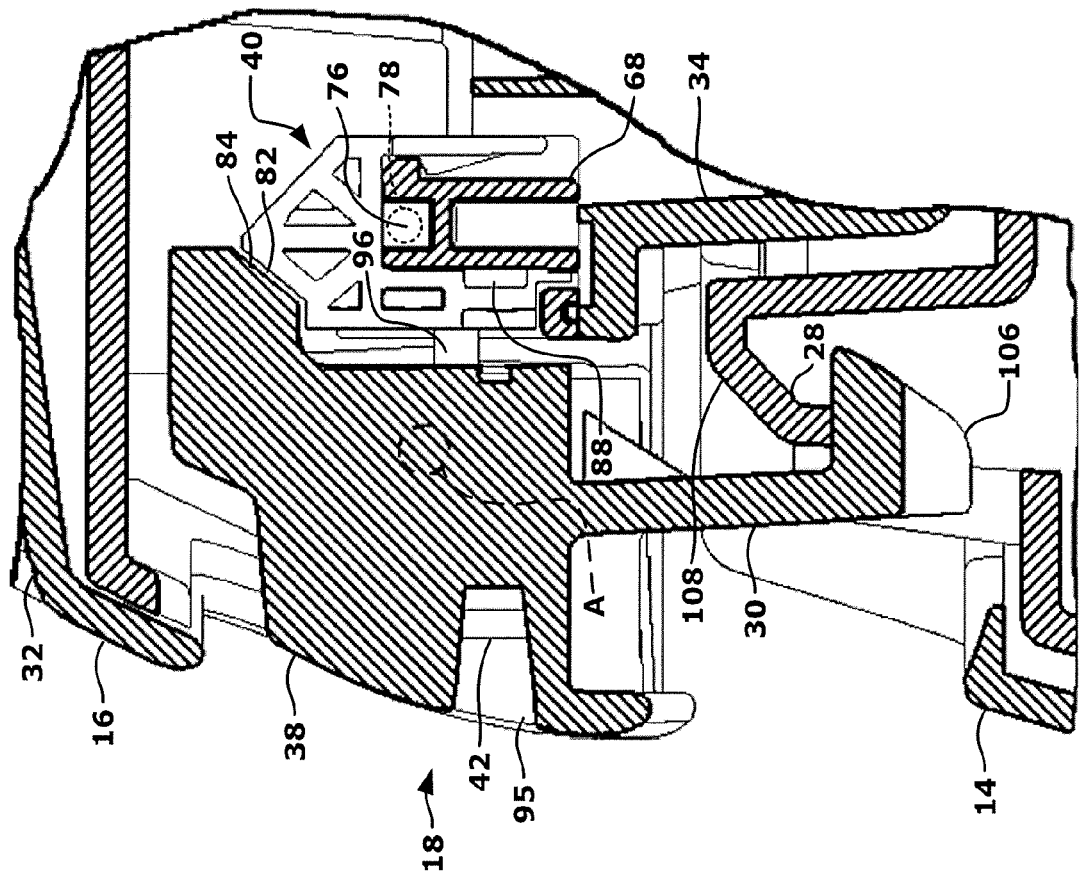
FIG. 4 is a vertical cross section through the securement apparatus taken along section lines 4-4 in FIG. 3.
Figure 5:
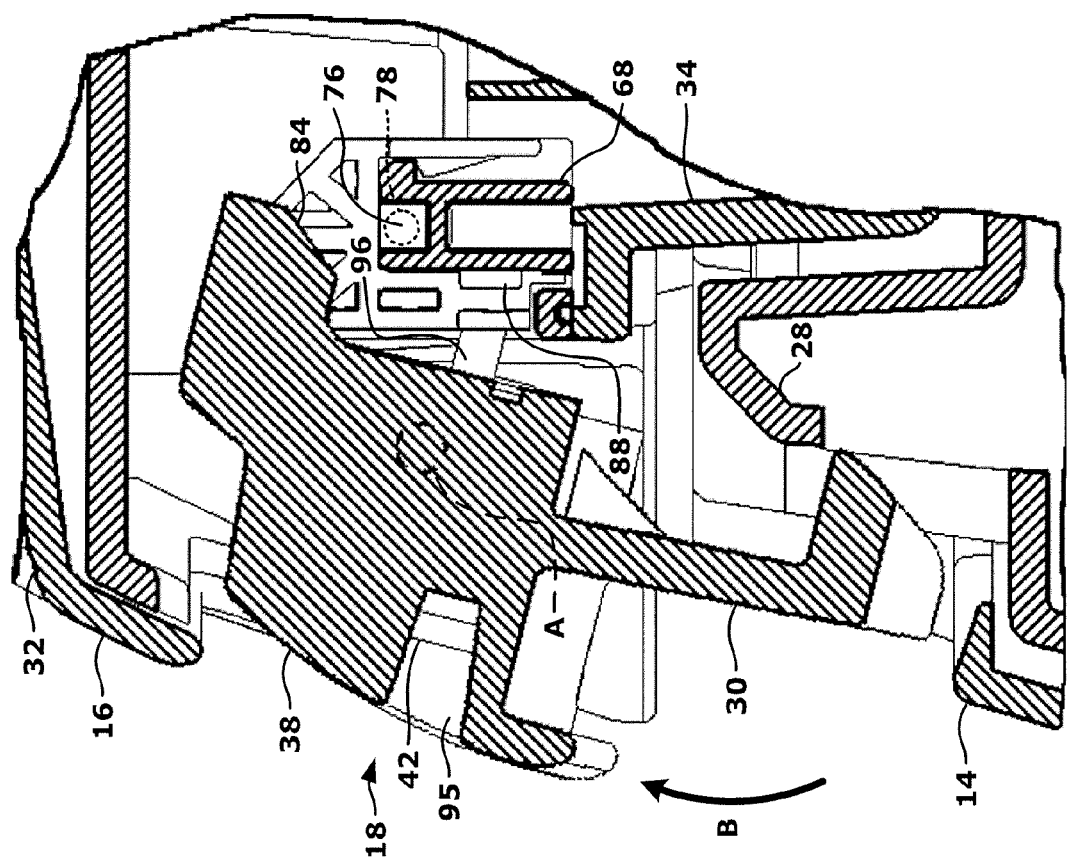
FIG. 5 is the vertical cross section of the securement apparatus as shown in FIG. 4 with the handle in an unlatched state.

In this example, the handle 38 is pivotally coupled to a hinge portion 44 of the base portion 36 by a pivot rod 46, such that the handle 38 is movable between a latched position (FIG. 4) and an unlatched position (FIG. 5) about a pivot axis A. That is, in the illustrated embodiment, the pivot rod 46 is received in rod receiving apertures 48 and 50 of the handle 38, and is secured in rod engagement apertures 52 and 54 in the hinge portion 44 of the base portion 36. A torsion spring 56 is disposed on the pivot rod 46 to bias the handle 38 with respect to the base portion 36 to the latched position about the pivot axis A. In particular, the coiled portion of the torsion spring 56 is disposed on the pivot rod 46. A first free end 58 of the torsion spring 56 contacts the base portion 36, while a second free end 60 of the torsion spring 56 contacts the handle 38. However, instead of a torsion spring 56, any other suitable type of spring or biasing component can be used. Furthermore, as shown in FIGS. 4, 5 and 7 and discussed in more detail below, the handle 38 includes the latch 30 that is configured to engage the body portion 14 and, more specifically, the catch 28 of the body portion 14 while the handle 38 is in the latched position.

As discussed in more detail below, the tumbler 40 is moveably disposed with respect to the base portion 36 between locked and unlocked positions. The tumbler 40 is configured to restrict movement of the handle 38 from the latched position to the unlatched position while the tumbler 40 is in the locked position. Furthermore, the lock 42 is configured to move the tumbler 40 between the locked and unlocked positions.

Figure 8:
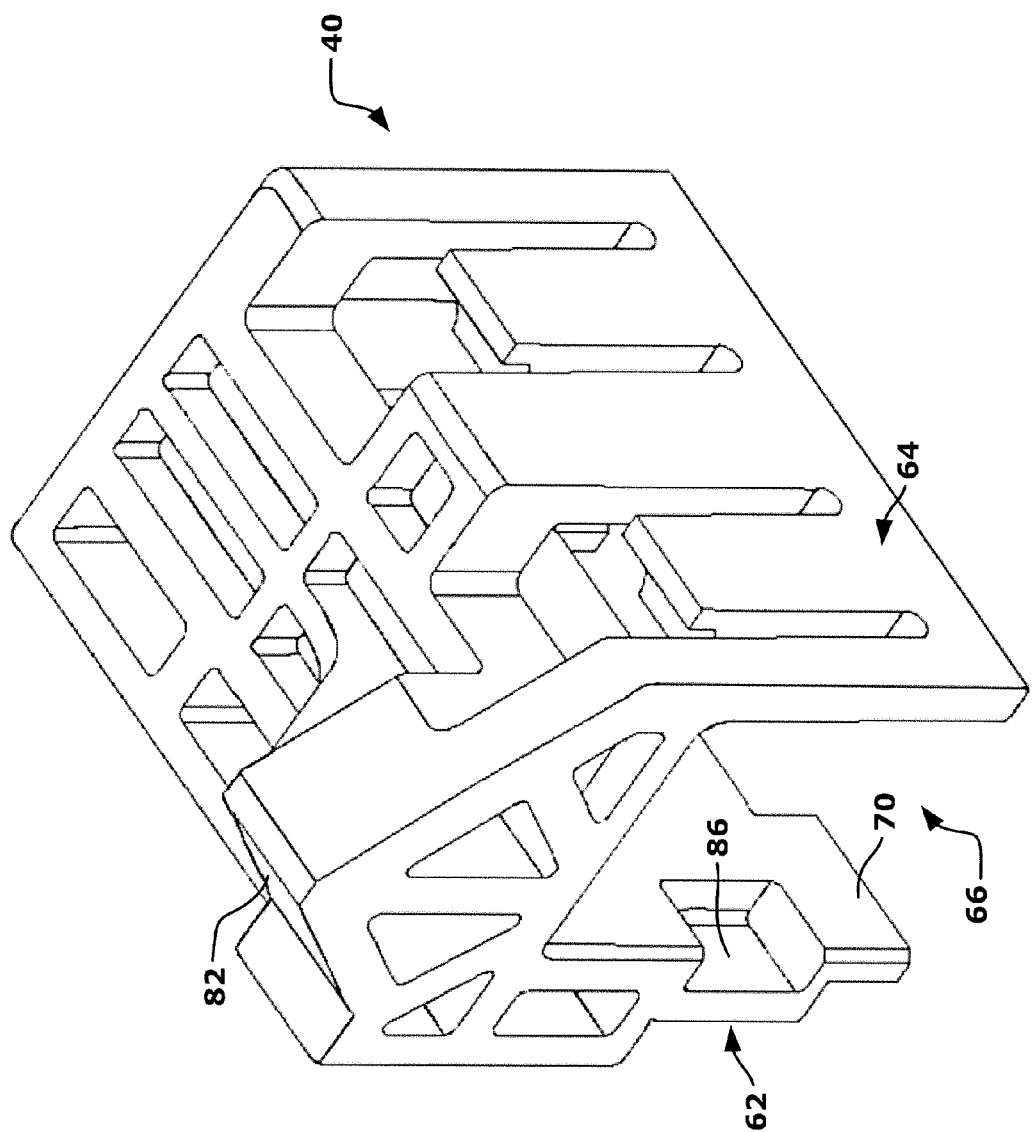
FIG. 8 is a detailed perspective view of a tumbler of the securement apparatus.
Figure 9:
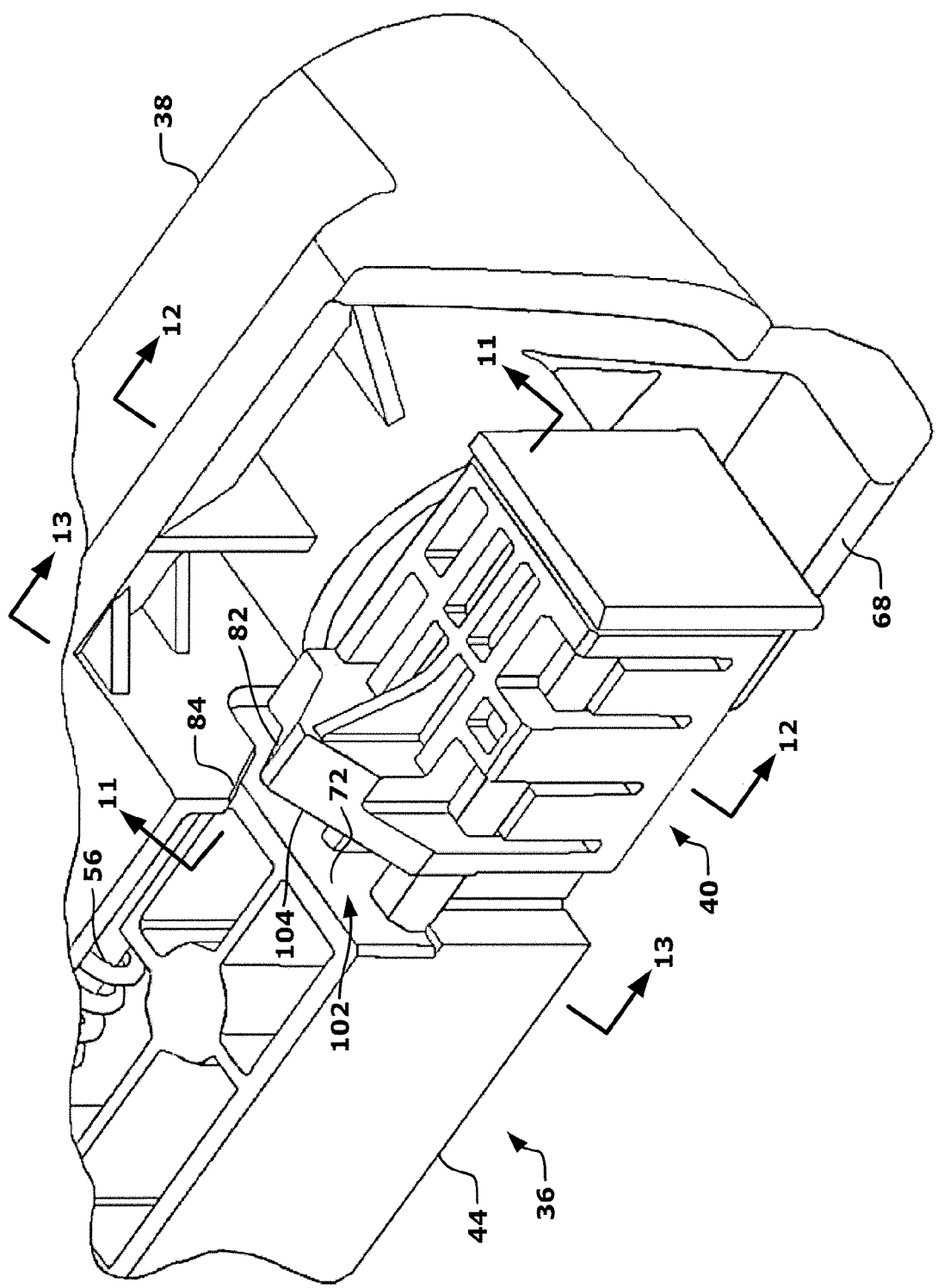
FIG. 9 is a rear perspective view of the securement apparatus with the tumbler in an unlocked position and the handle in a latched state.
Figure 19:
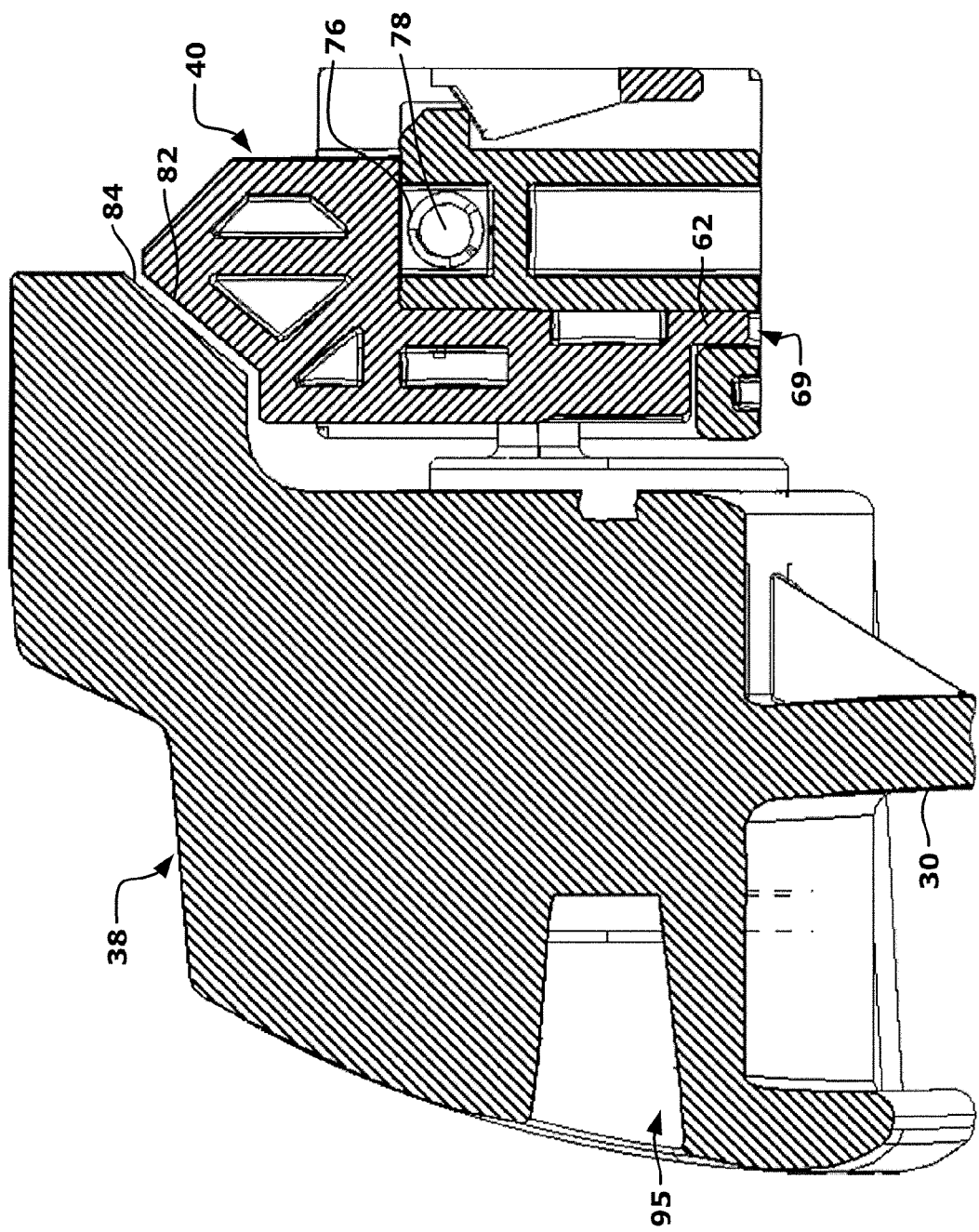
FIG. 19 is a vertical cross section through the securement apparatus taken along section lines 19-19 in FIG. 17.
Figure 20:
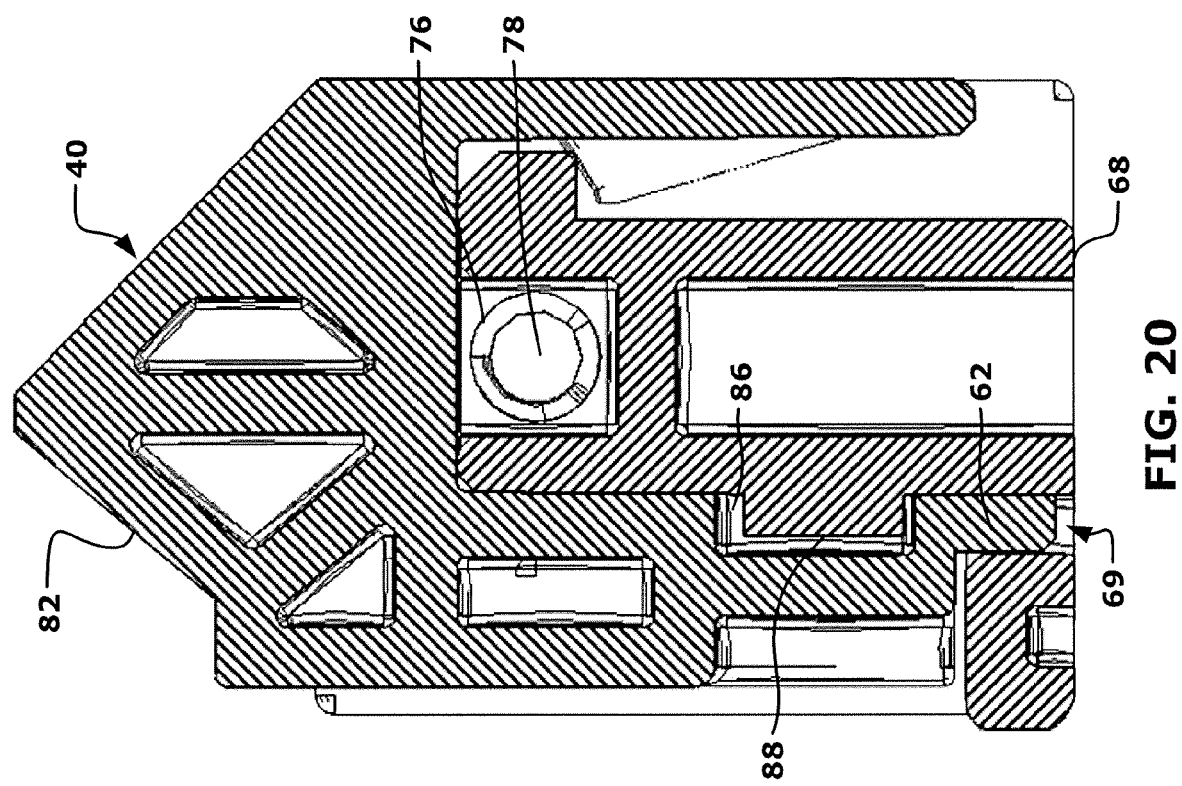
FIG. 20 is a vertical cross section through the securement apparatus taken along section lines 20-20 in FIG. 17.

In this example, the tumbler 40 is made from metal, hard plastic, composite or any other durable material. As shown in FIG. 8, the tumbler 40 includes legs 62 and 64 that define an opening 66 that receives a track portion 68 (FIG. 7) of the base portion 36. Specifically, the tumbler 40 is slidably coupled to the track portion 68 such that the inner surface 70 of the leg 62 of the tumbler 40 slidably contacts the track portion 68. Also, the track portion 68 is configured to include a channel 69 that receives a bottom portion of the leg 62 of the tumbler 40 (FIGS. 19 and 20). Thus the tumbler 40 is able to slide between the locked position and unlocked position.

Specifically, as discussed in more detail below, the tumbler 40 is slidable between a surface 72 of the hinge portion 44 that faces the track portion 68 and a stopping surface 74 formed at the opposite end of the track portion 68. A compression spring 76 is received over a projection 78 that extends longitudinally in the direction of the track portion 68. One end of the compression spring 76 contacts the surface of an abutment 80 in the track portion 68 from which the projection 78 extends. The other end of the compression spring 76 contacts an inner surface (not shown) of the tumbler 40. Accordingly, the compression spring 76 biases the tumbler 40 toward the stopping surface 74 or, in other words, towards the unlocked position. Although a compression spring 76 is shown in this example, any other suitable spring or biasing component can be used.

The tumbler 40 further includes an engagement surface 82 that is configured to contact and thus engage with a rotation edge 84 of the handle 38 when the tumbler 40 is in the locked position as discussed in more detail below. An interlock groove 86 is formed in the inner surface 70 of the leg 62 of the tumbler 40 to receive an interlock projection 88 (FIG. 20) as discussed in more detail below.

As further shown in FIG. 7, the lock 42 includes a key cylinder 90 that is received and secured into a collar 92 in the handle 38. The lock 42 in this example is a key type lock whose key cylinder 90 is rotated in a clockwise and counterclockwise direction by a key (not shown) that is inserted into a key slot 94 (FIG. 3) which is accessible via a key aperture 95 in the handle 38. Thus, the lock 42 is completely integral to the rotating handle 38, such that the lock 42 rotates with the handle 38 about axis A when the latch 30 is disengaged from the catch 28, and remains rigidly in place with the handle 38 when the latch 30 is engaged with the catch 28.

Figure 11:
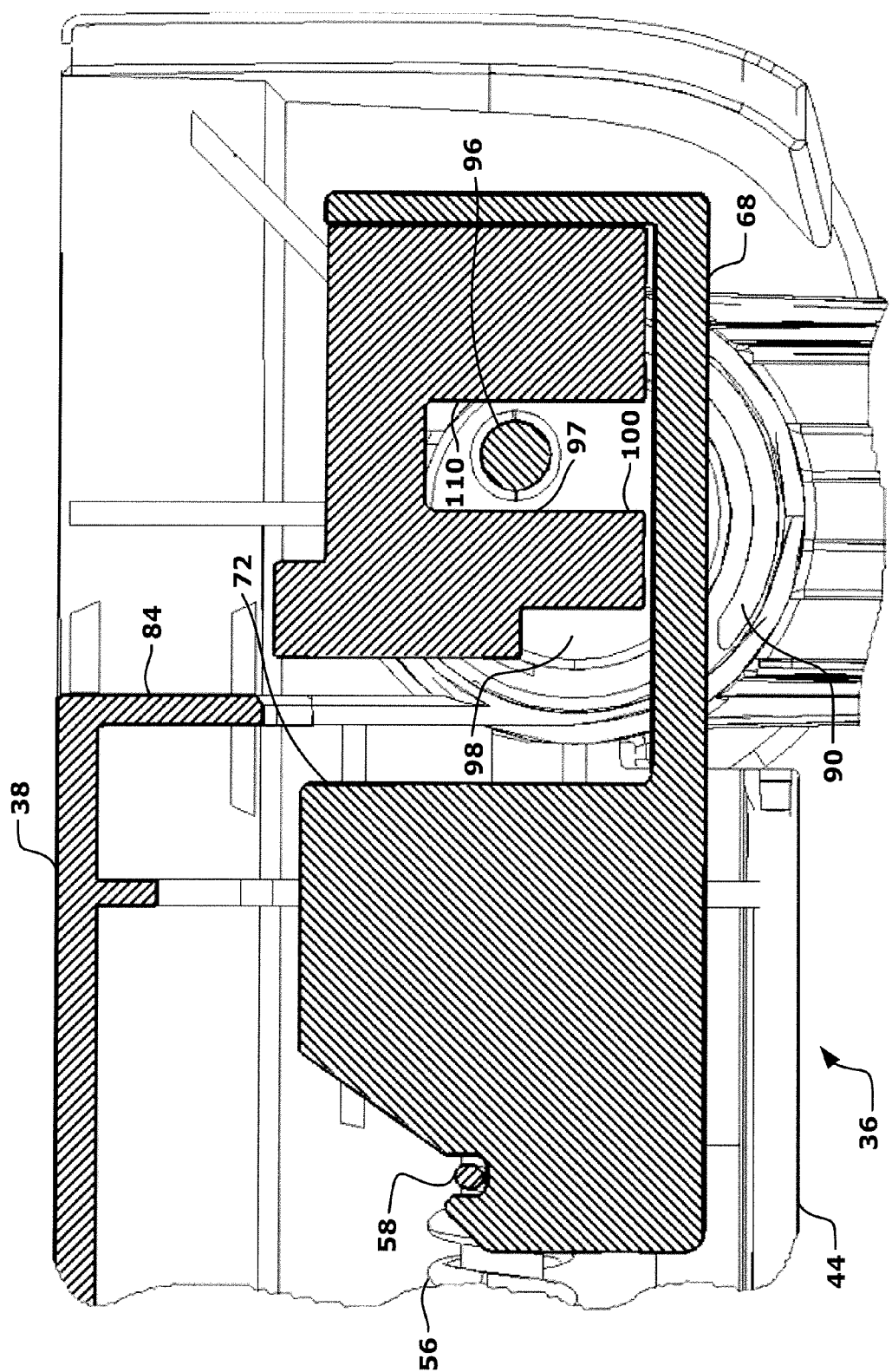
FIG. 11 is a vertical cross section through the securement apparatus taken along section lines 11-11 in FIG. 9.
Figure 12:
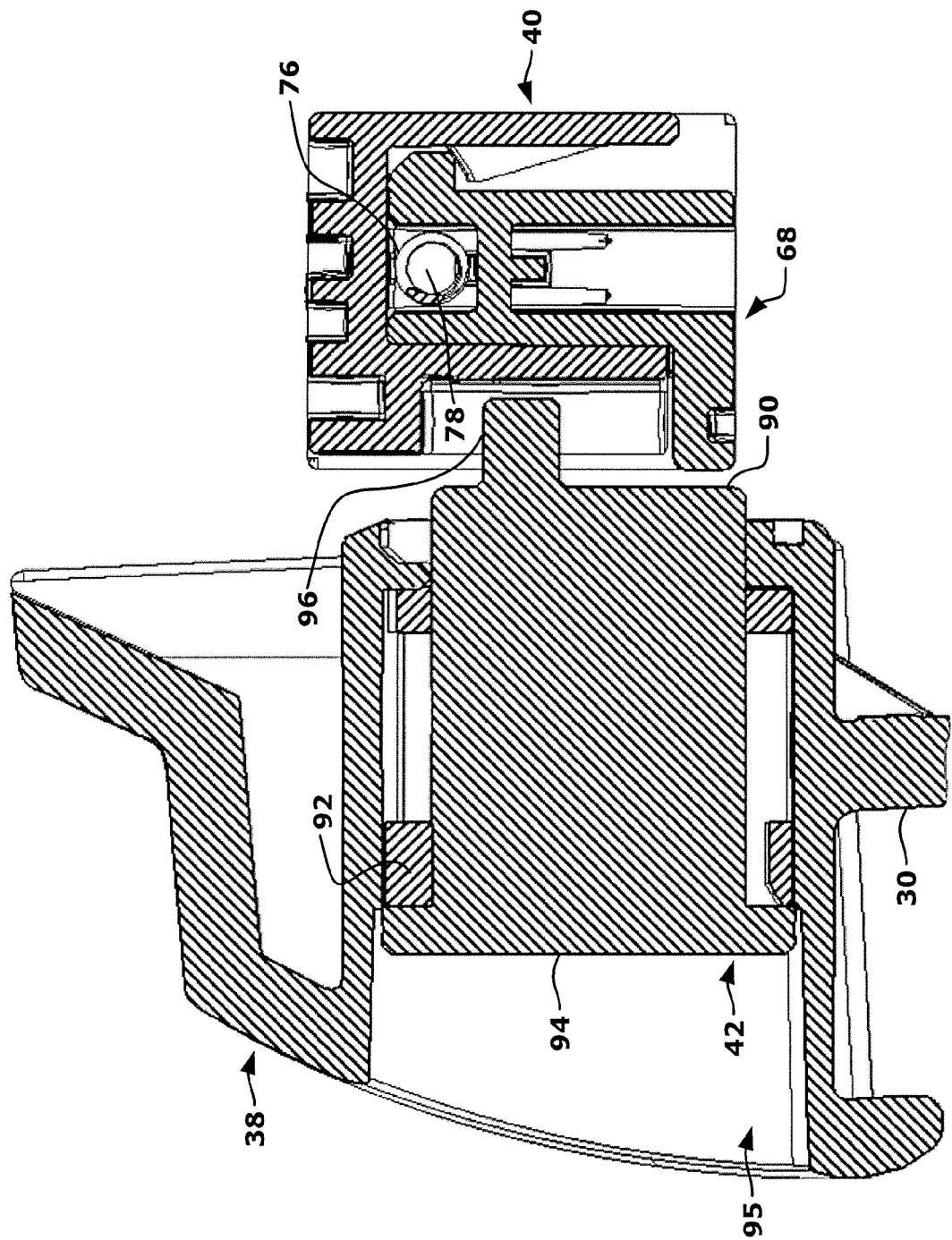
FIG. 12 is a vertical cross section through the securement apparatus taken along section lines 12-12 in FIG. 9.
Figure 13:
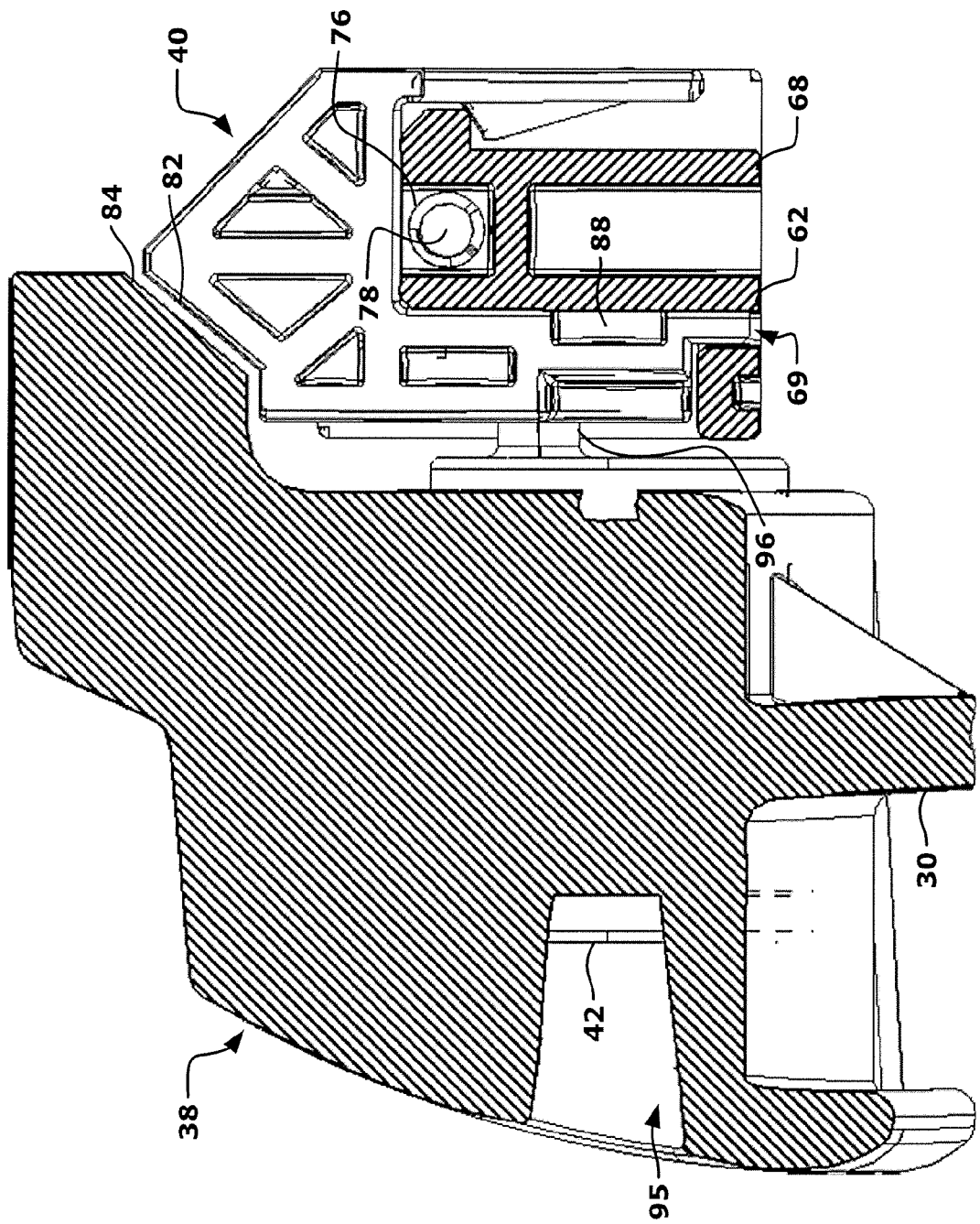
FIG. 13 is a vertical cross section through the securement apparatus taken along section lines 13-13 in FIG. 9.
Figure 14:
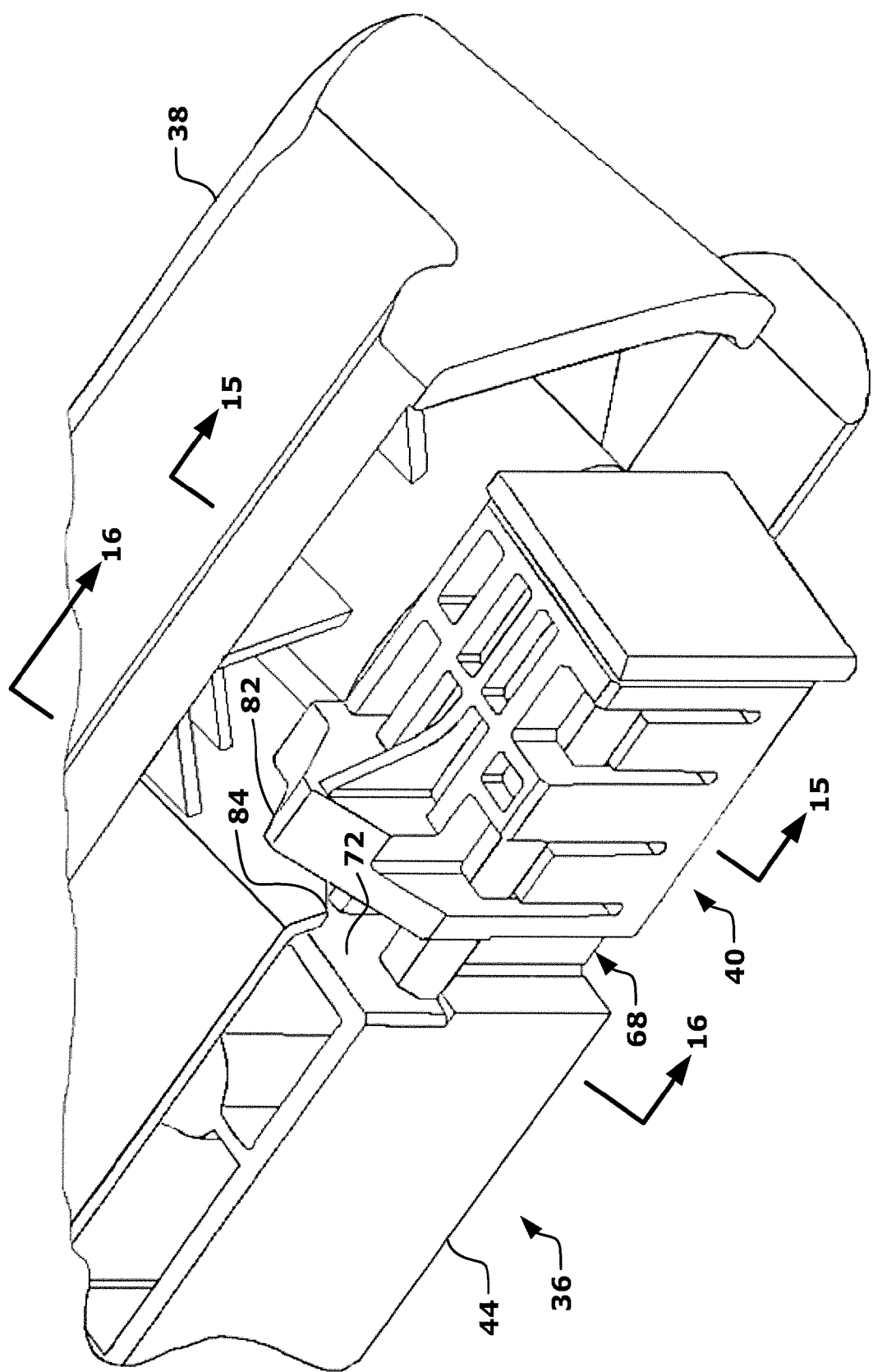
FIG. 14 is a rear perspective view of the securement apparatus with the handle in an unlatched state.

The lock 42 further includes a locking projection 96 that extends into a locking recess 98 in the tumbler 40 (FIGS. 11 and 12). Specifically, the locking projection 96 includes a cam surface 97 that engages at least one wall 100 that defines the locking recess 98 in the tumbler 40.

Figure 10:
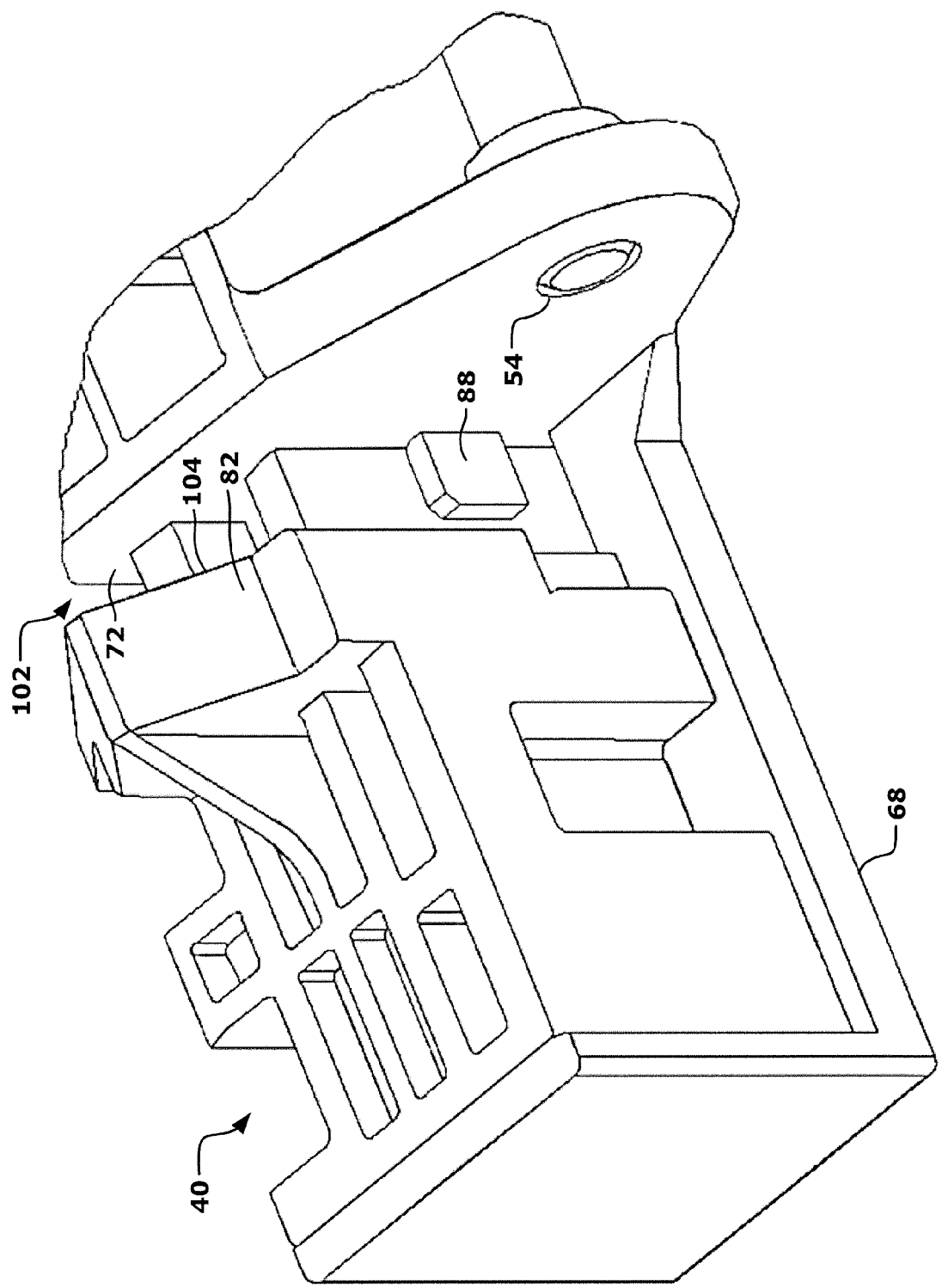
FIG. 10 is a front perspective view of the securement apparatus with the tumbler in the unlocked position.

An example of the operation of the securement apparatus 18 will now be discussed. FIGS. 9-16 show the tumbler 40 positioned in the unlocked position. Specifically, while the key cylinder 90 is oriented in the unlocked position (e.g., when the key slot 94 is in a vertical or substantially vertical orientation), the locking projection 96 is positioned in the locking recess 98 in the tumbler 40 so it contacts or is positioned proximate to the wall 100 of the tumbler 40 (FIG. 11). Accordingly, the compression spring 76 is permitted to bias the tumbler 40 against the stopping surface 74. The latch 30 is releasably engaged with the catch 28 as shown, for example, in FIG. 4. Also, as shown in FIG. 10, the interlock projection 88 is not received into the interlock groove 86 (FIG. 8).

Figure 15:
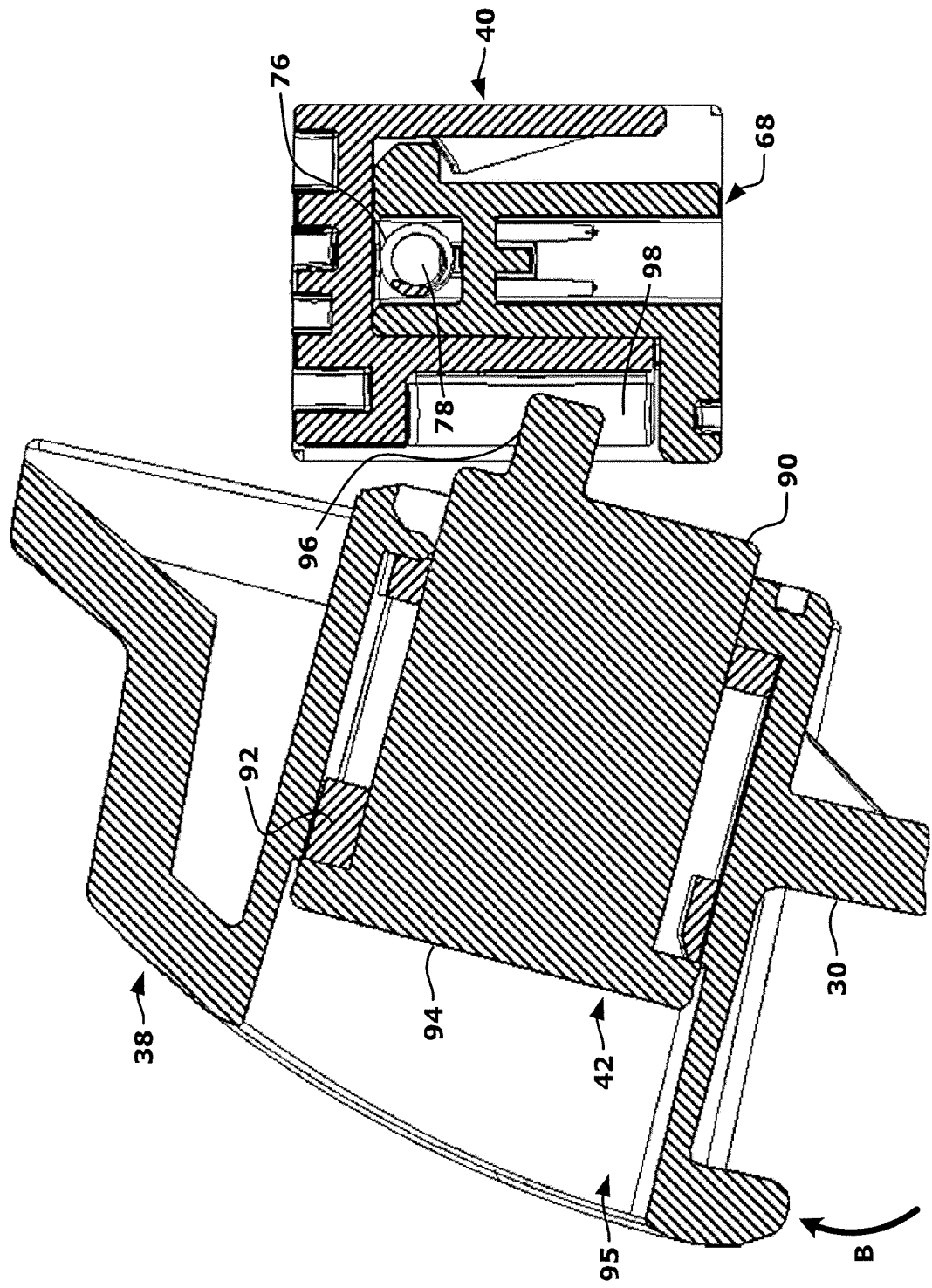
FIG. 15 is a vertical cross section through the securement apparatus taken along section lines 15-15 in FIG. 14.
Figure 16:
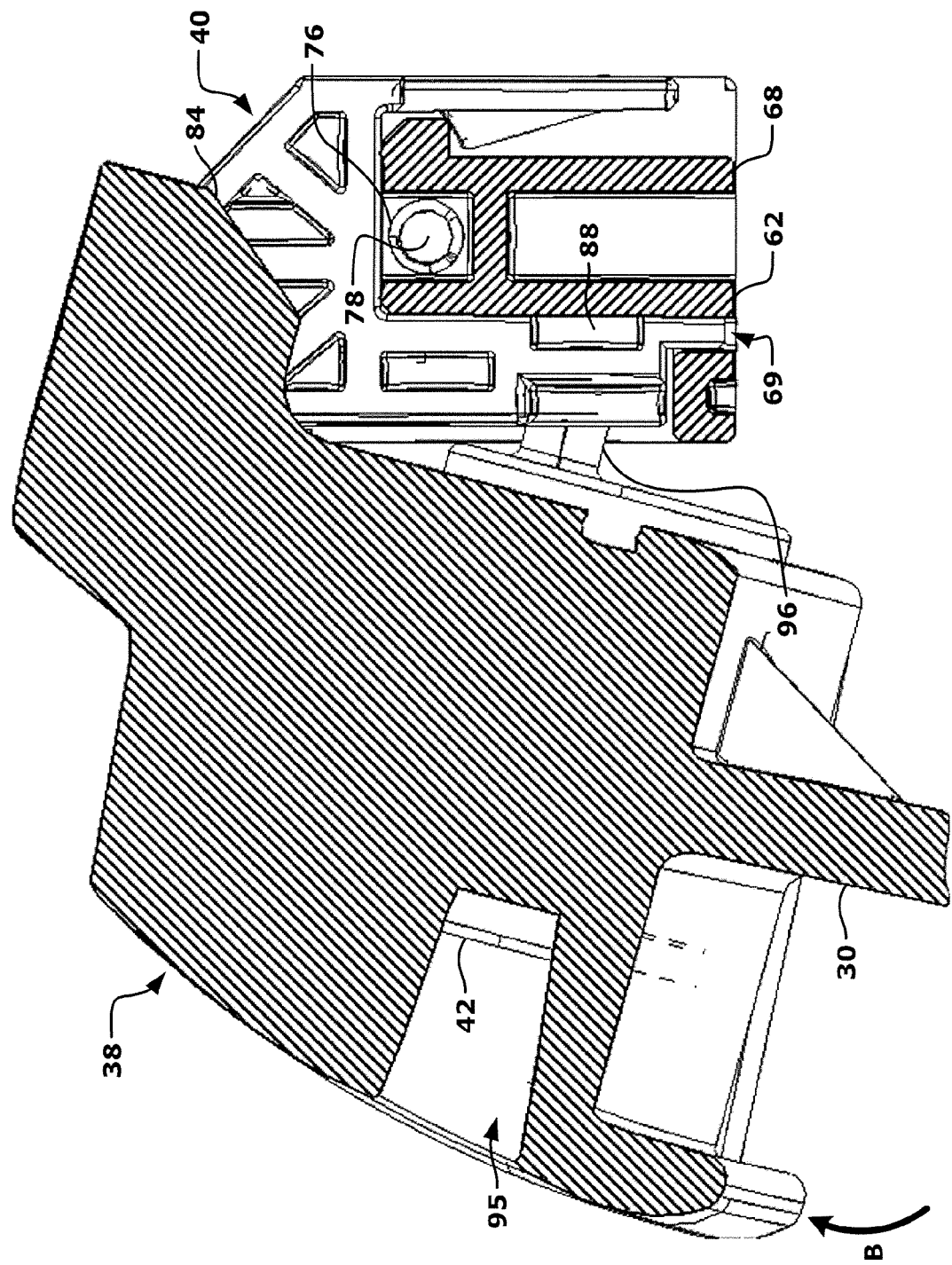
FIG. 16 is a vertical cross section through the securement apparatus taken along section lines 16-16 in FIG. 14.
Figure 17:
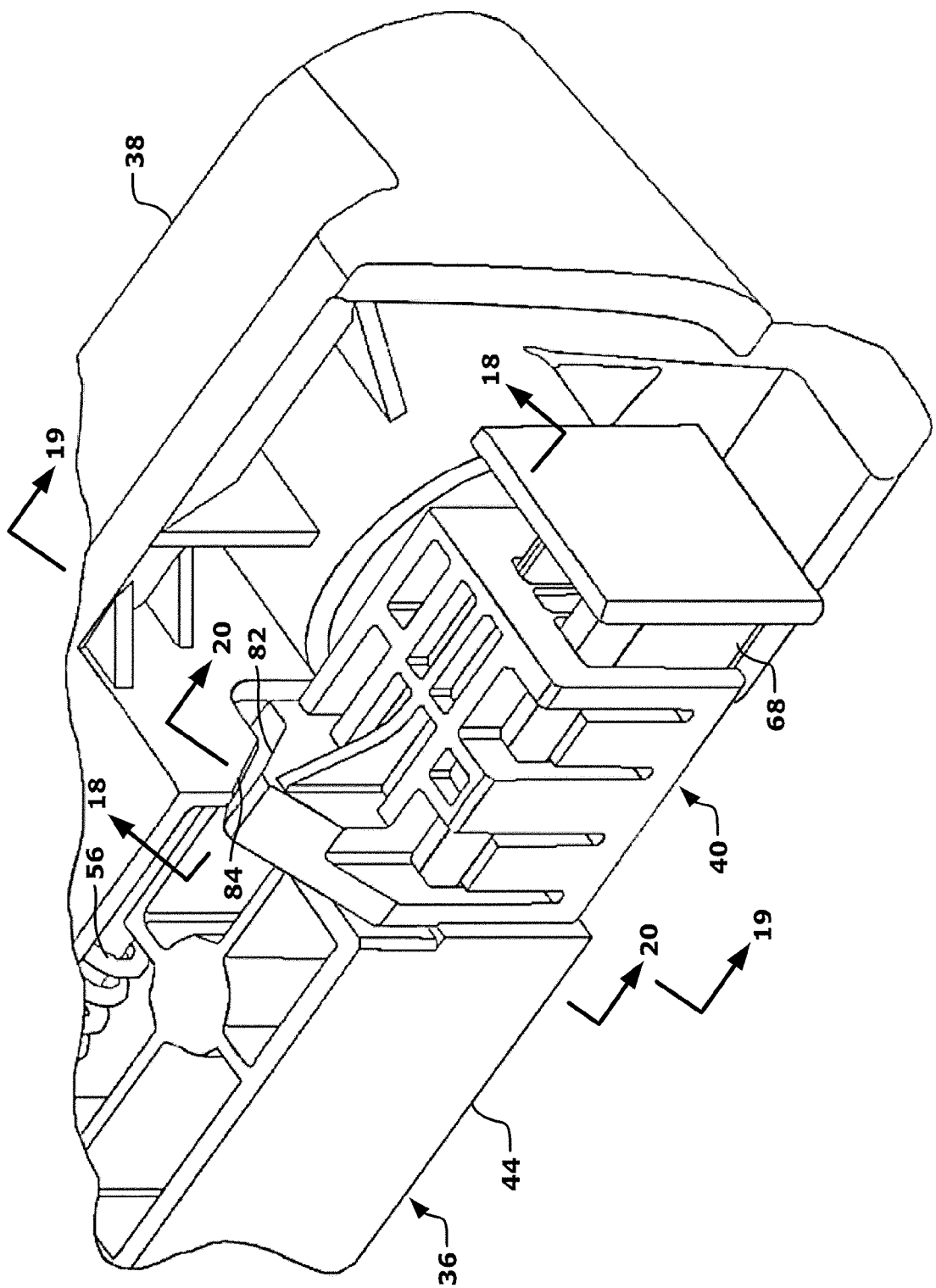
FIG. 17 is a rear perspective view of the securement apparatus with the tumbler in a locked position.

While the tumbler 40 is in the unlocked position, a space 102 is present between a side surface 104 of the tumbler 40 and the surface 72 of the hinge portion 44. This space 102 is sufficient to receive the rotation edge 84 of the handle 38 when the handle 38 is rotated about axis A to disengage the latch 30 from the catch 28 and thus open the closure panel 16. That is, the handle 38 includes a gripping portion which, as a appreciated from FIGS. 4, 5, 12, 13, 15, 16 and 19, can be located at the exposed portion of the handle 38 below the key aperture 95 for gripping by a user. As further shown, the latch 30 (latching projection) extends from the gripping portion and thus, the gripping portion and the latching projection cooperate to define an overall handle component. Accordingly, to disengage the latch 30 from the catch 28, a user applies a lifting force to the handle 38 (e.g., at the gripping portion of the handle 38) to rotate the handle in a direction B about axis A as shown in FIGS. 5 and 14-16. When this rotation occurs, the locking projection 96 rotates in a downward direction in the locking recess 98 in the tumbler 40 (FIG. 15). Furthermore, the rotation edge 84 rotates into the space 102, thus enabling the handle 38 to travel a sufficient rotational distance to disengage the latch 30 from the catch 28. The user can then lift the closure panel 16, which rotates about hinges 22 as shown in FIG. 2, to allow access to the access opening 24 and tray 26 of the body portion 14. Also, as can be appreciated from the above, when the user releases the handle 38, the torsion spring 56 urges the handle 38 in a rotational direction opposite to direction B. Hence, the torsion spring 56 maintains the handle 38 in a latching orientation with respect to the closure panel 16 even though the closure panel 16 is at an open position as shown in FIG. 2.

Figure 18:
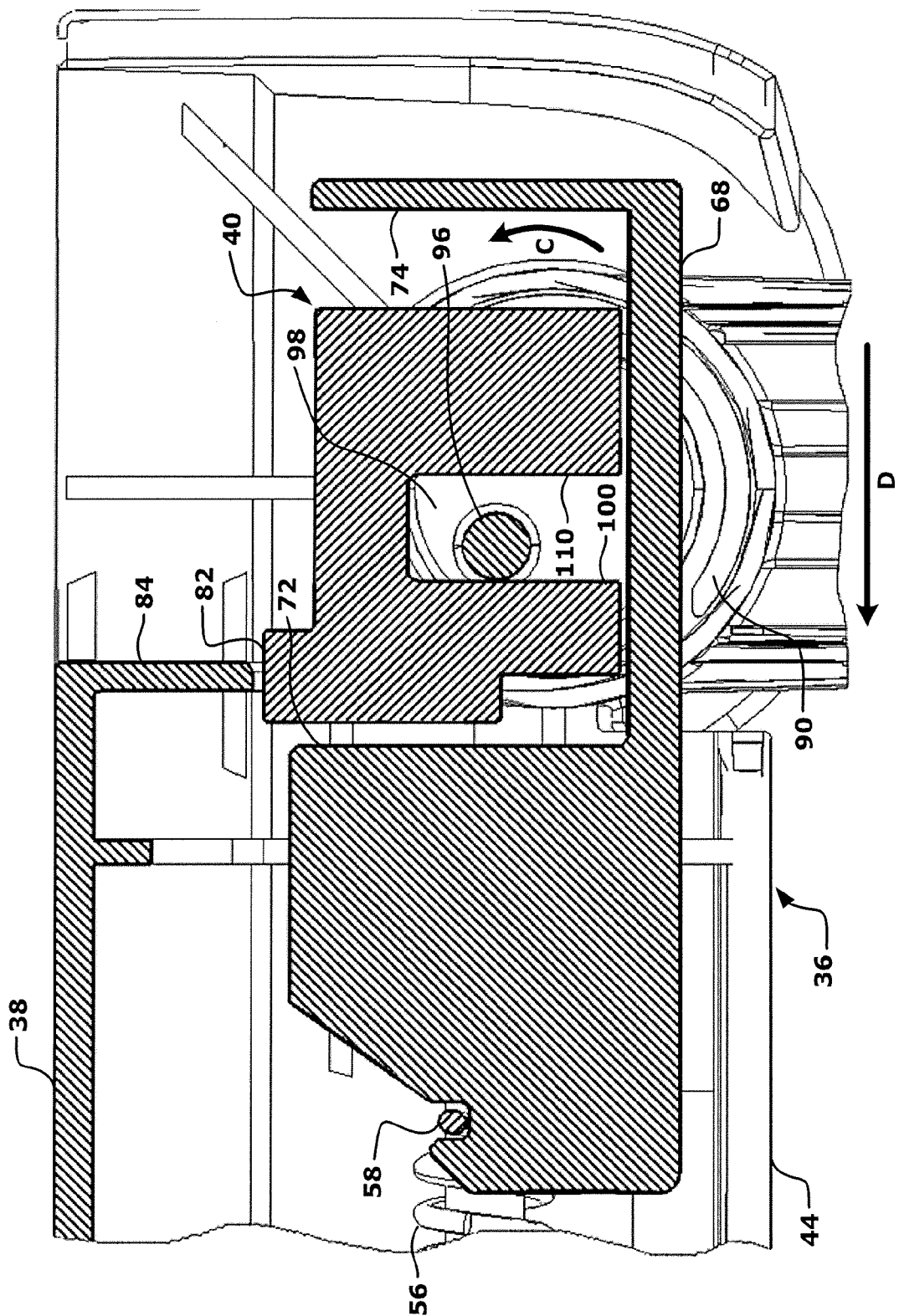
FIG. 18 is a vertical cross section through the securement apparatus taken along section lines 18-18 in FIG. 17.

When a user desires to lock closure panel 16, the user closes the closure panel 16 so that the latch 30 engages the catch 28. As with conventional latches, the slanted surface 106 of the latch 30 contacts the slanted surface 108 of the catch 28, and the downward force applied to the closure panel 16 is sufficient to cause the latch 30 to rotate about axis A so that the latch 30 can engage the catch. The user can then place a key (not shown) in the key slot 94, and turn the key in a direction C that in this example is clockwise when viewed in the direction toward the key slot 94. As shown in FIG. 18, the turning of the key rotates the key cylinder 90 in the direction C, and thus rotates the locking projection 96 that extends into a locking recess 98 in the tumbler 40.

During rotation, the locking projection 96 applies a force in a direction D against the wall 100 of the tumbler 40. This force opposes the force that the compression spring 76 applies against the tumbler 40. Accordingly, the force applied by the locking projection 96 moves the tumbler 40 in the direction D. In other words, the tumbler 40 moves parallel or substantially parallel to a rotation axis A of the handle 38.

As the tumbler 40 moves, a portion of the tumbler 40 that includes the engagement surface 82 enters the space 102 that was between the side surface 104 of the tumbler 40 and the surface 72 of the hinge portion 44. In this position, the engagement surface 82 aligns with the rotation edge 84 of the handle 38. Furthermore, the interlock projection 88 is received into the interlock groove 86 of the tumbler 40 (FIG. 20) when the tumbler 40 moves to the locked position. The handle 38 is thus in a locked state.

This interlock feature including the interlock projection 88 formed on an outer surface of the base portion 36 and the interlock groove 86 formed on the inner surface 70 of the leg 62 of the tumbler 40 increases the structural rigidity of the tumbler 40, and further ensures that the tumbler 40 does not rotate about the base portion 36 when the user attempts to open the handle 38 while in a locked state. A lower portion of the leg 62 of the tumbler 40 also engages channel 69 in the base portion 36 to prevent the tumbler 40 and base portion 36 from separating when the latch 30 is engaged with the catch 28 and the handle 38 is in the locked state.

That is, when a user attempts to rotate the handle 38 about axis A to disengage the latch 30 from the catch 28 and thus open the closure panel 16, the engagement surface 82 contacts the rotation edge 84 of the handle 38. In other words, the tumbler 40 restricts movement of the handle 38 by blocking a travel path of the rotation edge 84 while the tumbler 40 is in the locked position. Therefore, the engagement surface 82 substantially prevents the handle 38 from rotating about axis A. However, as illustrated in FIG. 19, a slight gap may optionally be maintained between the engagement surface 82 and the rotation edge 84 such that frictional forces do not impede sliding motion of the tumbler 40 along the track portion 68. For example, the handle 38 may only be capable of rotating 1 or 2 degrees when the tumbler 40 is in the locked position before the engagement surface 82 contacts the rotation edge 84 of the handle 38. Accordingly, the latch 30 cannot disengage from catch 28, and the securement apparatus 18 holds the closure panel 16 in the closed position.

When the user desires to open the closure panel 16, the user turns the key (not shown) in a direction opposite to direction C (i.e., counterclockwise). The turning of the key rotates the key cylinder 90 in the direction opposite to direction C, and thus rotates the locking projection 96 that extends into a locking recess 98 in the tumbler 40 in the direction opposite to direction C. The locking projection 96 thus enables the force applied by projection spring 78 against the tumbler 40 to move the tumbler in a direction opposite to direction D, and thus toward the stopping surface 74. The locking projection 96 can also apply a force against surface 110 of the tumbler 40 (FIG. 18) to assist in moving the tumbler 40 toward the stopping surface 74. Accordingly, the space 102 is again created between the side surface 104 of the tumbler and the surface 72 of the hinge portion 44.

Once the tumbler 40 is moved to the unlocked position, the engagement surface 82 no longer prevents the rotation edge 84 of the handle 38 from being received into the space 102. Therefore, the handle 38 can be rotated in direction B about axis A to disengage the latch 30 from catch 28 to enable the closure panel 16 to be opened as discussed above. For example, as illustrated in FIG. 5, the latch 30 may be configured to disengage from the catch 28 when the handle rotates approximately 15 degrees or more in direction B about axis A. Also, the base portion 36 may be configured to function as a stopping surface for rotational movement of the handle 38. For example, the base portion 36 may be configured to impede further rotation of the handle 38 after the handle rotates approximately 30 degrees in direction B about axis A.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A securement apparatus for a storage compartment that includes a closure panel and a body portion, the securement apparatus comprising:
   a base portion configured to couple to the closure panel;
   a handle pivotally coupled to the base portion to move between latched and unlatched positions, the handle including a gripping portion and a latching projection that extends from the gripping portion and is configured to engage the body portion while the handle is in the latched position;
   a tumbler moveably disposed with respect to the base portion between locked and unlocked positions, the tumbler being configured to restrict movement of the handle from the latched position to the unlatched position while the tumbler is in the locked position, the base portion including a hinge portion coupled to the handle and a track portion coupled to the tumbler, the hinge portion and the track portion being disposed at opposite ends of the base portion such that the hinge portion and the track portion are positioned in a side-by-side relationship along a direction that is parallel to a rotation axis of the handle; and
   a lock configured to move the tumbler between the locked and unlocked positions, the lock including a key cylinder that is positioned within a key aperture formed in the handle.

2. The securement apparatus according to claim 1, wherein the handle is biased toward the latched position.

3. The securement apparatus according to claim 1, wherein the tumbler is biased toward the unlocked position.

4. The securement apparatus according to claim 1, wherein the tumbler includes an interlock groove and the base portion includes an interlock projection that is received within the interlock groove when the tumbler moves to the locked position.

5. The securement apparatus according to claim 1, wherein the base portion includes a stopping surface that contacts the tumbler while the tumbler is in the unlocked position.

6. The securement apparatus according to claim 1, wherein the base portion includes a channel that slidably receives a portion of the tumbler.

7. The securement apparatus according to claim 1, wherein the handle includes a rotation edge, and
   the tumbler restricts movement of the handle by blocking a travel path of the rotation edge while the tumbler is in the locked position.

8. The securement apparatus according to claim 1, wherein the lock includes a locking projection and the tumbler includes a recess that receives the locking projection.

9. The securement apparatus according to claim 8, wherein the locking projection includes a cam surface that engages at least one wall that defines the recess in the tumbler.

10. The securement apparatus according to claim 1, wherein the latching projection and the gripping portion of the handle are unitarily formed.

11. The securement apparatus according to claim 1, wherein the tumbler includes an engagement surface that conforms to a shape of a rear surface of the gripping portion, the engagement surface being positioned adjacent to the rear surface of the gripping portion while the tumbler is in the locked position.

12. A securement apparatus for a storage compartment that includes a closure panel and a body portion, the securement apparatus comprising:
    a base portion configured to couple to the closure panel;
    a handle pivotally coupled to the base portion to move between latched and unlatched positions, the handle including a gripping portion and a latching projection that extends from the gripping portion and is configured to engage the body portion while the handle is in the latched position;
    a tumbler moveably disposed with respect to the base portion between locked and unlocked positions, the tumbler being configured to restrict movement of the handle from the latched position to the unlatched position while the tumbler is in the locked position; and
    a lock configured to move the tumbler between the locked and unlocked positions, the tumbler being configured to move parallel to a rotation axis of the handle and to slide along the base portion parallel to the rotation axis of the handle while moving between the locked and unlocked positions, the lock including a key cylinder that is positioned within a key aperture formed in the handle.

13. The securement apparatus according to claim 12, wherein
the tumbler includes an engagement surface that conforms to a shape of a rear surface of the gripping portion, the engagement surface being positioned adjacent to the rear surface of the gripping portion while the tumbler is in the locked position.

14. A storage compartment comprising:

a body portion;

a closure panel movably coupled to the body portion;

a securement apparatus comprising:
- a base portion coupled to the closure panel;
- a handle pivotally coupled to the base portion to move between latched and unlatched positions, the handle including a gripping portion including a rotation edge, and a latching projection that extends from the gripping portion and is configured to engage the body portion while the handle is in the latched position; and
- a tumbler disposed in the base portion to move between locked and unlocked positions, the tumbler including an inclined engagement surface and being disposed adjacent to a rear surface of the gripping portion while the tumbler is in the locked position such that the engagement surface restricts movement of the handle from the latched position to the unlatched position while the tumbler is in the locked position by directly contacting the rotation edge to block a travel path of the rotation edge.

15. The storage compartment according to claim 14, wherein
the base portion includes a hinge portion coupled to the handle and a track portion coupled to the tumbler.

16. The storage compartment according to claim 14, further comprising
a lock configured to move the tumbler between the locked and unlocked positions, the lock including a key cylinder that is positioned within a key aperture formed in the handle.

17. A storage compartment according to claim 14, wherein
the securement apparatus further comprises a lock configured to move the tumbler between the locked and unlocked positions.

18. The storage compartment according to claim 14, wherein
the closure panel is hingedly coupled to the body portion.

19. The storage compartment according to claim 18, wherein
the body portion has a cavity therein, and the handle is configured to permit the closure panel to move to an open position while the handle is in the unlatched position to permit access to the cavity, and the handle is configured to maintain the closure panel in a closed position covering the cavity while the handle is in the latched position.

20. The storage compartment according to claim 14, wherein
the latching projection and the gripping portion of the handle are unitarily formed.

* * * * *